June 21, 1960 L. WIEDMANN 2,941,640
COMBINATION CLUTCH-BRAKE
Filed Oct. 14, 1955 2 Sheets-Sheet 1
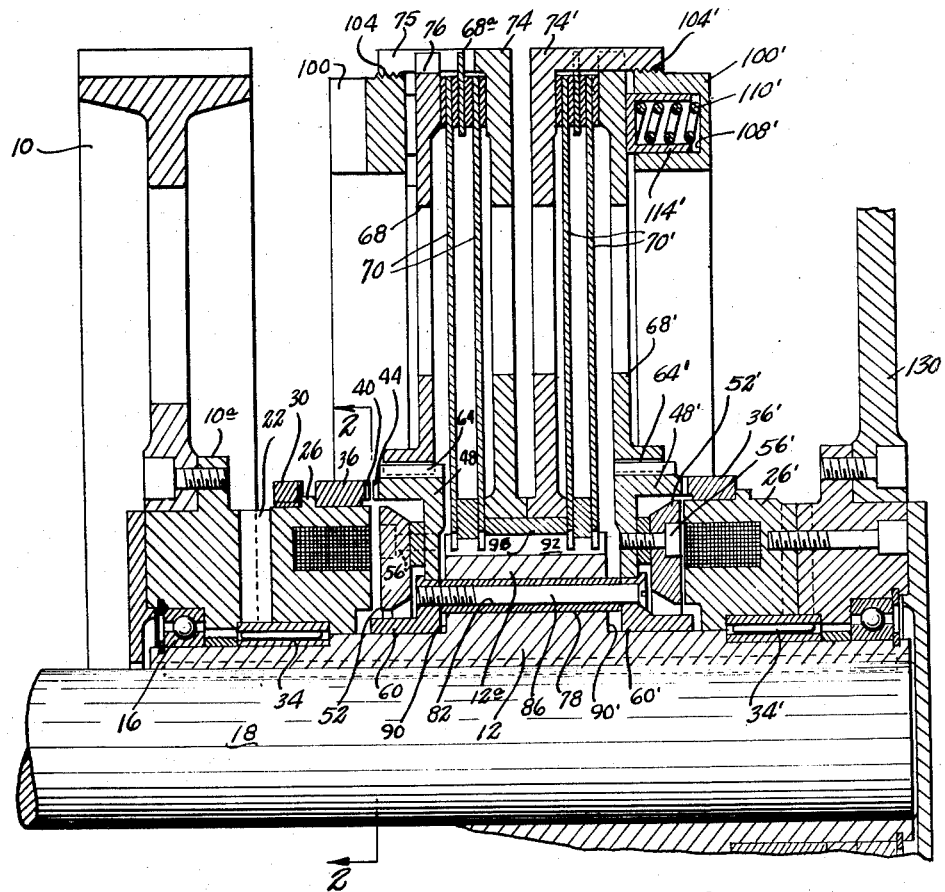
FIG. 1.
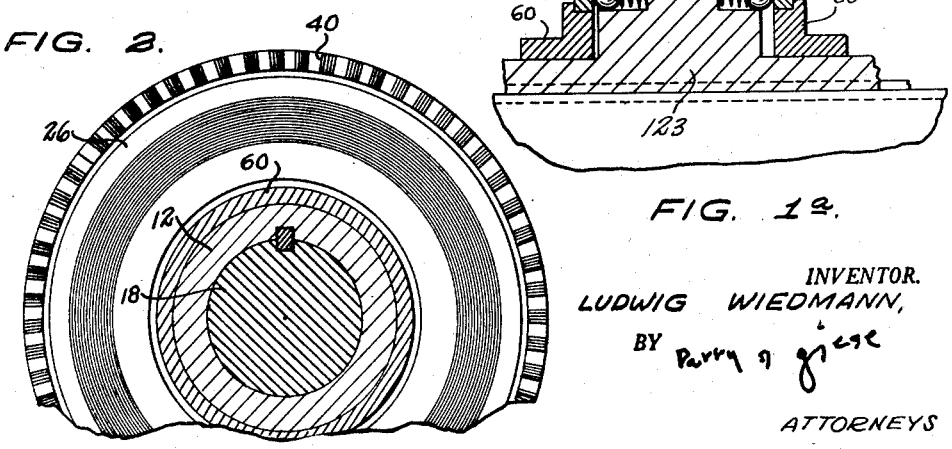
FIG. 2.
FIG. 1a.
INVENTOR.
LUDWIG WIEDMANN,
BY Parry & Griese
ATTORNEYS June 21, 1960

L. WIEDMANN 2,941,640

COMBINATION CLUTCH-BRAKE

Filed Oct. 14, 1955

INVENTOR.
LUDWIG WIEDMANN,
BY Parry & Gicre

ATTORNEYS

2,941,640
COMBINATION CLUTCH-BRAKE

Ludwig Wiedmann, Friedrichshafen, Germany, assignor to I-T-E Circuit Breaker Company, Philadelphia, Pa., a corporation of Pennsylvania Filed Oct. 14, 1955, Ser. No. 540,573

Claims priority, application Germany Apr. 26, 1955

5 Claims. (Cl. 192—18)

This invention relates to electromagnetic clutches and brakes particularly for use in machine tools.

An object of the invention is to provide a combination electromagnetically actuated clutch and brake which will have a short engaging and braking time.

Another object of the invention is to provide an electromagnetic clutch and brake wherein the clutch effects positive drive and also friction drive in tandem therewith to serve as a safety feature in the event of overload.

A further object of the invention is to provide a device wherein the brake has a positively engaging member as well as frictionally engaging members in tandem therewith to serve as a safety device in the event of occurrence of brake overloading.

A still further object of the invention is to provide compact structure for both the clutch and brake elements so as to minimize flywheel effect of the rotating parts.

Briefly, my invention comprises a solenoid operated clutch having positively engaging teeth actuated by an armature wherein the power transmission thus effected passes through a frictional clutch to the take-off shaft. The frictional clutch is adjustable as to the degree of friction therein so that a predetermined torque may be transmitted; when such torque is exceeded corresponding to a machine overload, the friction clutch is capable of slipping so that no damage to the machine can occur. Similarly, my invention provides a solenoid operated brake having positively engaging teeth, the braking effect acting through a frictional clutch wherein the degree of braking force can be predetermined by adjustment. Thus, when a particular braking force is exceeded, the frictional clutch slips so as to avoid damage to the associated moving parts of the clutch or machine.

My invention will now be described in conjunction with the appended drawing in which:

Fig. 1 is a partial elevation in cross-section of one form of the invention.

Fig. 1a is a cross-section of a portion of the invention illustrating a detail.

Fig. 2 is a partial elevation in section through 2—2 of Fig. 1, and

Figure 3:
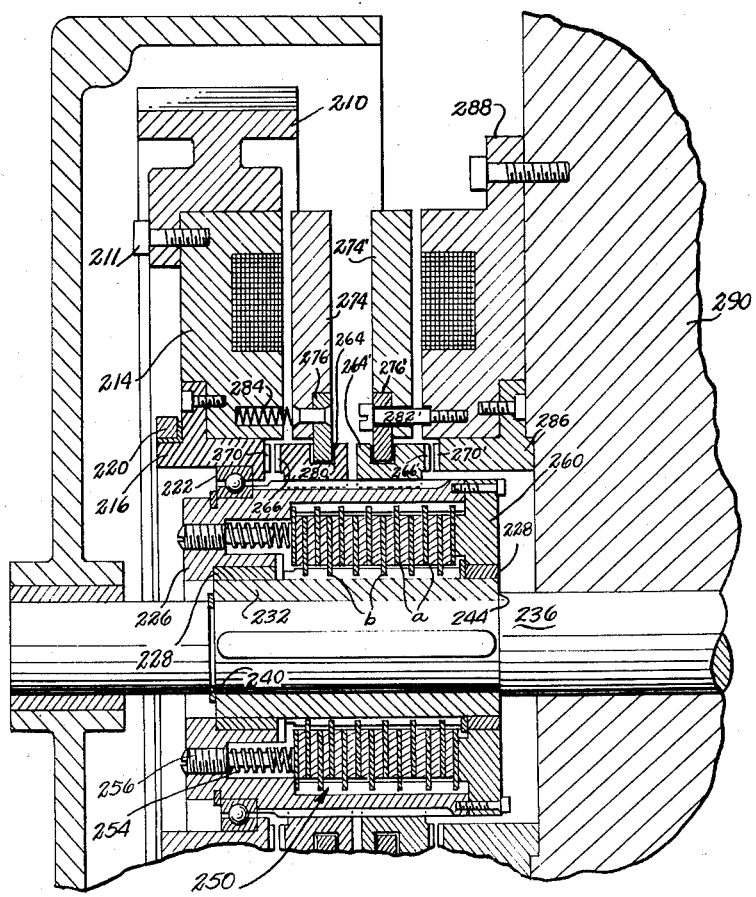
Fig. 3 is a partial cross-section in elevation of a modified form of the invention.

Referring now to Figs. 1, 1a and 2, wherein unprimed reference characters denote clutch parts and primed reference characters denote identical brake parts, my invention comprises, on the clutch side, a driving gear 10 connected to member 10a carried on a sleeve 12 through an intermediate bearing 16. Sleeve 12 is keyed on a driven shaft 18. The driving gear 10 is coupled by intermeshing radial teeth 22 on its hub to a solenoid body 26 having a conductive slip-ring 30. The solenoid body 26 is toroidal in shape and mounted on a bearing 34 which is in turn carried by the sleeve 12. A clutch ring 36 is fixedly secured to solenoid 26 and has teeth 40 engageable with teeth 44 of a clutch ring 48 secured to armature 52 as by bolts 56. Clutch ring 48 is rotatively carried on a collar 60 supported on the sleeve 12 which collar is slidable on the sleeve, but not rotative thereon, as will presently appear. Clutch ring 48 has slidable splined engagement at 64 with a pressure plate 68 of a friction clutch comprising internal disks 70 and an outer pressure plate 74 from which is formed a housing for the friction clutch by being provided with a peripheral rim having a slot 75 in which is keyed a tongue 76 of pressure plate 68 and also a friction ring 68a intermediate the disks 70. The construction of the friction clutch is more or less conventional to the extent described thus far. However, the disks 70 are maintained in predetermined frictional engagement in a manner to be hereinafter explained.

Sleeve 12 has an enlarged hub 12a in which are provided angularly spaced bores 78, each receiving a respective spacer sleeve 82 through which passes a respective bolt 86. The construction serves to tie together the collars or rings 60 and 60' where collar 60' rotatively supports the armature 52' which is actuable upon energization of brake solenoid 26'.

From the above description it will be apparent that the rings 60 and 60' are integral and can slide axially on the sleeve 12 but are non-rotative with respect thereto because the bolts 86 pass through the hub 12a. The reciprocal motion of the rings is limited by the shoulders 90 and 90' of the hub 12a.

The outer periphery of hub 12a has splined engagement at 92 with the friction disks 70 of the friction clutch and also with the friction disks 70' of the friction brake. Thus, when the clutch is engaged, that is, teeth 40 and 44 enmeshed by virtue of energization of solenoid 26, the clutch ring 48 effects rotation of the pressure disks 68 and 74 whereby the friction disks 70 are rotated to effect rotation of the sleeve 12 by virtue of the splining at 92. In this manner driven shaft 18 is rotated.

It will be apparent that the plate 74 of the friction clutch and the plate 74' of the friction brake are axially locked on a collar 96 which may be carried on the splined portion 92 of hub 12a. However, plates 74 and 74' are rotative with respect to driven shaft 18. Thus, if for any reason the load on shaft 18 exceeds the degree of torque which the friction clutch can transmit by virtue of predetermined frictional engagement between the disks and pressure plates, the elements 68 and 74 will slip to preclude damage to any part of the machine. In other words, the positive drive from gear 10 via clutch teeth 40 and 44 is transmitted via splines 64 to pressure plate 68 and thence through the friction clutch disks 70 to the hub 12a. Any load on the driven shaft which cannot be overcome by the predetermined degree of torque transmission of the friction clutch will necessarily cause the disks 70 to slow up or stop while the pressure plates 68 and 74 being still supplied with power via the positive engagement of splines 64 and teeth 40—44 will continue to rotate. Accordingly, no damaging force will be experienced by the moving parts of the machine.

The mode of predetermining the degree of torque transmission of the friction clutch is by providing adjusting disk, spider or ring 100 having peripheral threaded engagement with the friction clutch housing at 104. Since the construction is identical for both the brake and the clutch, reference is now had to the brake side of the device to explain the mode of adjustment. Thus, the adjusting ring 100' is provided with a plurality of sockets 108' in which are carried respective compression springs 110'. Each spring biases a pressure cup 114' against the pressure plate 68'. By rotating the adjusting ring 100' its position with respect to 68' is changed and the pressure on the springs 110' may be varied. This effects lessening or increasing of the force exerted by the plate 68' against the friction disks 70' and thus predetermine the amount of torque transmission of the arrangement. In other words, the degree of braking effect of which the friction brake is capable may be selectively varied. Similarly, the degree of torque transmission of which the friction clutch is capable is varied in the same way.

The number of biasing spring arrangements carried by the ring 100 or the ring 100' is not critical and can vary as desired, there preferably being at least three so as to effect balanced mechanical forces at equally spaced points. It is important to note, however, that the arrangement effects in a simple manner a mode of providing uniform force against the pressure plates of the clutch or brake by simply rotating a single element such as the ring 100 or the ring 100'.

The brake side of my invention is substantially the same in component parts as heretofore described for the clutch side; that is, a solenoid 26' is carried on sleeve 12 by means of bearings 34', which solenoid when energized can attract the armature 52' to thus engage the brake rings 36' and 48'. Solenoid body 26' is, of course, fastened securely so as to be non-rotative. For example, solenoid body 26' is shown as connected to the casing 130. The driven shaft 18, when rotated, effects rotation of friction disks 70' through splining 92 thus causing rotation of pressure plate 68' and through the splines 64' rotates a brake ring 48' which is rotatably mounted on the collar 60'. In the position shown in Fig. 1 the rings 36' and 48' are engaged. Accordingly, a braking effect is being applied to driven shaft 18. Should, however, the forces on this shaft overcome the degree of friction provided in the friction brake, the friction disks 70' will continue to rotate, slipping past the stationary pressure plates 68' and 74', which, in this instance are fixed to the casing 130 via the brake rings 36' and 48'.

Preferably some means of maintaining a central position for the integrally bolted collars 60 and 60' whereat their respective armatures are equidistant from the faces of the respective solenoids should be provided. This can be accomplished as shown in Fig. 1a wherein the hub 12a carries a series of springs such as 132 and 132' which press respective balls 133 and 133' against respective rings 48 and 48' to maintain them at equal distances from the sides of the hub. The springs 132 may alternate in angular disposition with the bolts 86 in the hub 12a.

It will, of course, be appreciated that suitable electrical control means is utilized in conjunction with the clutch-brake arrangement described above so that either of the solenoids may be selectively energized.

Referring now to the form of the invention shown in Fig. 3, the construction comprises a driving (or driven) gear 210 having a concentric solenoid 214 integrally secured therein as by bolts 211. The solenoid has an open center in which is carried a clutch ring 216 mounted on a bearing 222 which bearing is carried on a friction clutch housing 226. The housing 226 is carried on bearings 228 which ride on a sleeve 232 keyed to the driven shaft 236. A lock ring 240 serves to maintain the sleeve 232 in place against a shoulder 244 provided on the shaft. The friction clutch 250 comprises a multiple disk type of clutch having the disks a splined to the housing 226 and the disks b splined to the sleeve 232 as shown. A plurality of springs 254 maintain a desired degree of compression of the multiple disk arrangement, which compression may be selectively varied by means of set screws 256 to maintain a predetermined, frictional engagement whereat under excessive load of torque transmission to the machine the friction clutch will slip. Likewise, when it is desired to brake the machine excessive braking load will cause the friction clutch to slip. An end cover 260 completes the friction clutch 250, the construction being of a generally conventional nature.

Carried on the housing 226 and reciprocally splined thereto is a clutch ring 264 having radial teeth 266 which are engageable with teeth 270 of the clutch ring 216. An armature 274 is secured to a split ring 276 rotative in a peripheral groove 280 of ring 264. Thus, it will be apparent that the armature can rotate with respect to the friction clutch. The armature itself is carried by the solenoid 214 by means of angularly spaced bolts such as the bolt 282', it being noted that prime numerals refer to the brake side of the device, and are counterparts of unprimed numerals found in the clutch side. A plurality of angularly spaced springs such as 284 is carried by the solenoid to bias the armature away therefrom whereby teeth 266 and 270 are not normally engaged unless the solenoid is energized. On the brake side of the construction, the arrangement is similar; namely, a brake ring 264' is reciprocally splined on collar 226 and has teeth 266' engageable with teeth 270' of a stationary brake ring 286 bolted to the solenoid body 288 which is in turn fastened to the casing 290. Brake ring 264' is actuated by the armature 274' via split ring 276' to effect engagement of the teeth 266' and 270'.

In summary, the structure of Figure 3 may be considered as comprising a driving member 210 (which may be a driven member) which is to be selectively connected to a driven member 210 (which may be a driving member). The selective connection is achieved through a clutch means, a brake means and a torque transmitting means. The clutch means has an output member or clutch ring 216 which is connected to the driven member and a first input member or clutch ring 264. The brake means is formed of an output member such as housing 290 which is selectively connected to an input member such as clutch ring 264'. Interposed between the driving or driven member of the input members of the clutch means and brake means is the torque transmitting means or friction clutch 250. The torque transmitting means has an input member such as laminations "b" connected to the shaft 236 and an output member such as laminations "a" which are connected to the input members 264 and 264' of the clutch means and brake means respectively.

In operation, when solenoid 214 is energized so as to transmit power to the machine, any load greater than the torque transmitting setting of friction clutch 250 will cause the clutch to slip, it being noted that power can be transmitted to the driven shaft only through the clutch housing 226 and plates a in compression against plates b splined to the shaft 236. Similarly when it is desired to brake the machine, solenoid 214, now being deenergized and solenoid 288 being energized, holding force on the shaft must be transmitted through the clutch 250. Should the shaft require excessive braking force, it will effect slippage of disks b with respect to a, depending on the degree of compression provided for the multiple disk clutch.

I claim:

1. In a device of the class described, a driving gear, a driven shaft, said driving gear being mounted rotatively on said driven shaft, a solenoid rotative with said driving gear, a toothed clutch ring rotative with said solenoid, an armature rotatively mounted on said driven shaft, a co-acting toothed clutch ring integral with said armature and engageable with said first-mentioned clutch ring, a friction clutch comprising a plate having rotary motion with said armature and axially movable with respect thereto, a second plate in said friction clutch secured to said driven shaft, whereby torque may be transmitted from said driving gear through said clutch rings to said first-mentioned friction clutch plate and thence by friction to said second-mentioned friction clutch plate, to rotate said driven shaft.

2. An electromagnetically operated brake comprising a fixed solenoid surrounding a shaft, an armature carried on said shaft and rotative with respect thereto, respective brake rings carried by said armature and said solenoid engageable upon energization of said solenoid to hold said armature positively stationary, a slippable friction brake intermediate said armature and said shaft whereby when said armature is held stationary brake-holding forces are transmitted through said friction brake to said shaft for predetermined brake load conditions.

3. A device as set forth in claim 2 including means for predetermining the degree of friction of said friction brake so as to predetermine the degree of holding force on said shaft.

4. In combination; a driving member, a driven member, a clutch means, a brake means, and a torque transmitting means; said clutch means having an output member selectively operatively connectible to said driven member and an input member; said brake means having an output member selectively connectible to an input member; said torque transmitting means having an input member operatively connected to said driving member and an output member, the output torque of said torque transmitting means being limited in a predetermined manner; said output member of said torque transmitting means being operatively connected to said input member of said clutch means and to said input member of said brake means; said driving member being operatively connected to said driven member when said clutch means is operated to connect said input member of said clutch means to said driven member; said brake means being operatively connected to said driven member when said brake means input member is connected to said brake means output member and said clutch means input member is connected to said driven member; said connection from said brake means output member to said driven member being isolated from said driving member by said torque transmitting means.

5. A device as set forth in claim 4 wherein said torque transmitting means is adjustable to adjust the maximum torque transmitted by said driving member to said clutch means or to said brake means.

References Cited in the file of this patent

UNITED STATES PATENTS

| | | |
|---|---|---|
| 1,229,984 | Libby | June 12, 1917 |
| 1,328,966 | Pollard | Jan. 27, 1920 |
| 1,448,095 | Steele et al. | Mar. 13, 1923 |
| 1,756,907 | Payne | Apr. 29, 1930 |
| 2,159,326 | Harwood et al. | May 23, 1939 |
| 2,187,955 | Sonnenberg | Jan. 23, 1940 |
| 2,368,304 | Kattwinkel | Jan. 30, 1945 |
| 2,481,028 | Lear | Sept. 6, 1949 |
| 2,482,007 | King | Sept. 13, 1949 |
| 2,675,835 | Kiekhaefer | Apr. 20, 1954 |
| 2,693,263 | Becking | Nov. 2, 1954 |
| 2,710,359 | Nixon | June 7, 1955 |
| 2,796,159 | Connors | June 18, 1957 |
| 2,829,746 | Knochl | Apr. 8, 1958 |

FOREIGN PATENTS

| | | |
|---|---|---|
| 617,406 | Great Britain | Feb. 4, 1949 |